(12) United States Patent
Biles et al.

(10) Patent No.: US 9,513,959 B2
(45) Date of Patent: Dec. 6, 2016

(54) CONTENTION MANAGEMENT FOR A HARDWARE TRANSACTIONAL MEMORY

(75) Inventors: Stuart David Biles, Little Thurlow (GB); Geoffrey Blake, Ann Arbor, MI (US); Trevor Nigel Mudge, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 1406 days.

(21) Appl. No.: 12/149,003

(22) Filed: Apr. 24, 2008

(65) Prior Publication Data
US 2009/0133032 A1   May 21, 2009

Related U.S. Application Data

(60) Provisional application No. 60/989,734, filed on Nov. 21, 2007.

(51) Int. Cl.
*G06F 9/46* (2006.01)
*G06F 9/52* (2006.01)
*G06F 9/48* (2006.01)

(52) U.S. Cl.
CPC ........... *G06F 9/466* (2013.01); *G06F 9/467* (2013.01); *G06F 9/4881* (2013.01); *G06F 9/528* (2013.01)

(58) Field of Classification Search
CPC ............ G06D 9/52; G06F 9/4881; G06F 9/52; G06F 9/466; G06F 9/467; G06F 9/528
USPC ........................................................ 718/106
See application file for complete search history.

(56) References Cited

U.S. PATENT DOCUMENTS

| | | | | |
|---|---|---|---|---|
| 5,530,933 A | * | 6/1996 | Frink et al. | 711/141 |
| 5,724,536 A | * | 3/1998 | Abramson et al. | 712/216 |
| 5,781,752 A | | 7/1998 | Moshovos et al. | |
| 5,983,225 A | * | 11/1999 | Anfindsen | |
| 6,161,166 A | | 12/2000 | Doing et al. | |
| 6,256,726 B1 | | 7/2001 | Hotta et al. | |
| 6,604,160 B1 | * | 8/2003 | Le et al. | 710/240 |
| 7,089,253 B2 | * | 8/2006 | Hinshaw et al. | 707/703 |
| 2004/0073909 A1 | | 4/2004 | Arimilli et al. | |
| 2005/0055490 A1 | * | 3/2005 | Widell et al. | 711/1 |
| 2007/0198979 A1 | * | 8/2007 | Dice et al. | 718/100 |
| 2009/0138890 A1 | * | 5/2009 | Blake et al. | 718/106 |
| 2015/0154045 A1 | * | 6/2015 | Blake et al. | 718/106 |

OTHER PUBLICATIONS

International Search Report and Written Opinion of the Searching Authority dated Mar. 16, 2009 for PCT/US2008/012935.

(Continued)

*Primary Examiner* — Daniel Pan
(74) *Attorney, Agent, or Firm* — Nixon & Vanderhye P.C.

(57) ABSTRACT

A hardware transactional memory 12, 14, 16, 18, 20 is provided within a multiprocessor 4, 6, 8, 10 system with coherency control and hardware transaction memory control circuitry 22 that serves to at least partially manage the scheduling of processing transactions in dependence upon conflict data 26, 28, 30. The conflict data characterizes previously encountered conflicts between processing transactions. The scheduling is performed such that a candidate processing transaction will not be scheduled if the conflict data indicates that one of the already running processing transactions has previously conflicted with the candidate processing transaction.

46 Claims, 6 Drawing Sheets

(56) References Cited

OTHER PUBLICATIONS

M.F. Spear et al, "Conflict Detection and Validation Strategies for Software Transactional Memory" Distributed Computing, Jan. 2006, pp. 179-193.
T. Xin et al, "Detection for Conflicts of Dependencies in Advanced Transaction Models" Proceedings of the $9^{th}$ International Database Engineering & Application Symposium (IDEAS'05), Jul. 2005.
International Preliminary Report on Patentability dated Apr. 9, 2010 for PCT/US2008/012935.
Office Action mailed Dec. 12, 2011 in co-pending U.S. Appl. No. 12/292,565.
Scherer et al., "Advanced Contention Management for Dynamic Software Transactional Memory," (2005), 9 pages.
Scherer et al., "Contention Management in Dynamic Software Transactional Memory," (2004), 10 pages.
Bai et al., "A Key-Based Adaptive Transactional Memory Executor," (2006), 16 pages.
Office Action mailed Nov. 12, 2014 in co-pending U.S. Appl. No. 12/292,565.
Chrysos et al, "Memory Dependence Prediction using Store Sets" 1998, 12 pages.
U.S. Appl. No. 14/618,211, filed Feb. 10, 2015, Blake et al.

\* cited by examiner

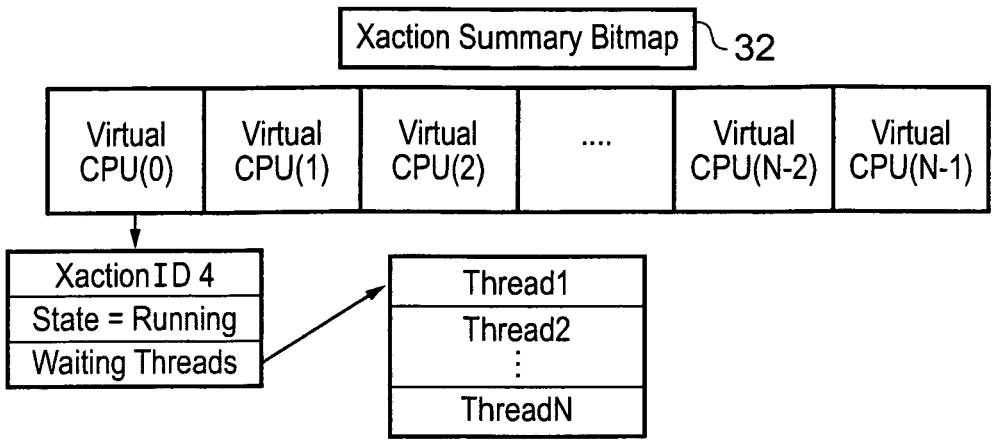

FIG. 4

```
schedule (xaction virtCPU_Idx) {
  conflict_summary = getRunningXactionSummary(xaction)
  running_xaction_summary = getRunningSummary()
  if (!(conflict_summary
      & running_xaction_summary)) {
    scheduleXactionRunning(virtCPU_Idx, xaction)
    updateRunningSummary()
    return
  }
  conflict_list = getXactionConflictList(xaction)
  for each entry in CPU_mask {
    if (entry.status == Running &&
       (conflict_summary & hash(entry.xactionID))){
      if (conflictPresent(conflict_list, entry.xactionID) }
        insertionOntoWaitQueue(xaction)
    }
  }
  scheduleXactionRunning(virtCPU_Idx, xaction)
  updateRunningXactionSummary()
  return
} unscheduleXactionRunning(virtCPU_Idx) {
  entry = CPU_mask[virtCPU_Idx]
  lock(entry)
    entry.status = notRunning
  unlock(entry)
  wakeUpWaiting()
}
```

FIG. 5

CONTENTION MANAGEMENT FOR A HARDWARE TRANSACTIONAL MEMORY

This application claims priority from U.S. Provisional Patent Application No. 60/989,734, filed 21 Nov. 2007, the entire contents of that application is hereby incorporated by reference.

BACKGROUND OF THE INVENTION

1. Field of the Invention

This invention relates to the field of data processing systems. More particularly, this invention relates to the field of contention management within hardware transactional memories.

2. Description of the Prior Art

It is desirable to perform parallel processing of program code. As multi-processor systems have become more widely available, the use of parallel processing of computer programs has become wide spread. Whilst such parallel processing can significantly improve performance, it suffers from the disadvantage of an increased complexity in the writing computer programs suitable for parallel execution. One technique uses software locks to enforce exclusive access to data items so as to avoid different portions of a computer program being executed in parallel inappropriately interfering with each other. A difficulty of this approach is that the programs must be written to set and reset the locks at appropriate times; this is a complex and error prone task.

An alternative approach to facilitating the parallel processing of computer programs is the use of a transactional memory. With this approach a computer program can be considered to be broken down into two distinct types of entities. These are "processing threads" and "processing transactions". A "processing thread" is a piece of computer code that runs on a single processor concurrently with code running on other processors. A "processing transaction" is a piece of work that is executed by a thread, where memory accesses performed by the transaction appear atomic as far as other threads and transactions are concerned. A single thread can execute many transactions.

A transactional memory system may be implemented fully as a software layer, fully in hardware or a combination of the two. For the purposes of this description, a hardware transactional memory system is understood to have at least some hardware features supporting the transactional memory model. Whilst the description focuses on a hardware transaction memory system, the invention is applicable to a software only transactional memory system.

A hardware transactional memory serves to identify conflicts arising between processing transactions, e.g. read-after-write hazards. If such a conflict arises where two processing transactions seek to access the same data, then the hardware transactional memory triggers an abort of at least one of the processing transactions and the restoring of the state prior to initiation of that processing transaction. The scheduling mechanisms within the data processing system will then reschedule that processing transaction to be executed at a later time, this later time typically being determined on the basis of an exponential backoff whereby the scheduling mechanism suspends the transaction for a time before it is rescheduled to provide the opportunity for the conflict to be removed by completion of the conflicting processing transaction. If the rescheduled processing transaction conflicts again, then it can again be aborted and rescheduled after an exponentially increased delay.

SUMMARY OF THE INVENTION

Viewed from one aspect the present invention provides a method of processing data using a plurality of processors and a transactional memory, said method comprising the steps of:

detecting with said transactional memory conflict arising between concurrent processing transactions executed by respective processors accessing shared data within said transactional memory;

in response to said conflicts, storing conflict data for respective processing transactions indicative of with which other processing transactions a conflict has previously been detected; and scheduling processing transactions to be executed in dependence upon said conflict data.

The present technique uses conflict data indicative of processing transactions between which conflicts have previously been detected so as to control the scheduling of future processing transactions. Thus, the scheduling may be considered to "learn" from past behaviour and schedule the processing transactions as to use the hardware transactional memory in a manner which reduces the likelihood of future conflicts arising and thereby increases the efficiency of operation of the overall system.

A transactional memory system may be implemented fully as a software layer, fully in hardware or a combination of the two for the purposes of the present technique, most implementations will feature a hardware element, but a software scheme could benefit e.g. determine conflict in software, update conflict tables; potentially provide a mask checking instruction in the hardware that traps to a software handler, a fully software approach is also possible.

The transactional memory can facilitate the forming of the conflict data by providing a transaction identifier indicative of a processing transaction with which a conflict has arisen. Using the transactional memory to provide a transaction identifier in this way simplifies the task of subsequently forming the conflict data.

The hardware transactional memory can store the transaction identifier within at least one of a dedicated transaction identifier register, a general purpose register within a register bank and a memory location (e.g. a predetermined location known to the transactional memory runtime software or pushed onto a stack (possibly with other exception state)). As a conflict has arisen, the current context of a register bank will generally be treated as corrupt and will be restored as part of the abort process. Accordingly, the use a of a general purpose register for storing the transaction identifier generated by the hardware transactional memory will not overwrite any data value which needs to be kept within the register bank.

Whilst the conflict data could be generated entirely by hardware mechanisms, it is convenient in at least some embodiments to use conflict software to form the conflict data including reading the transaction identifier which is generated by the hardware transactional memory.

The scheduling in dependence upon the conflict data can be performed by scheduling software, scheduling hardware or a combination of scheduling software and scheduling hardware.

It will be appreciated that the conflict data can have a wide variety of different forms. In one form the conflict data comprises a plurality of transaction entries, each transaction entry corresponding to a processing transaction and storing data at least indicative of one or more processing transactions with which said processing transaction has previously conflicted. In this way, previously conflicting processing transactions can be stored on a transaction-by-transaction basis.

In order to speed conflict prediction (which may be performed in hardware), each transaction entry may include a summary conflict entry indicative of one or more processing transactions with which the processing transaction of that transaction entry has previously conflicted. The scheduling process can compare this summary conflict entry for a candidate processing transaction to be scheduled with corresponding summary status data indicative of currently executing processing transactions so as to identify any potential conflict(s).

The summary data can be formed in a way which can give false positives (i.e. indicate a potential conflict when upon detailed examination no conflict will arise), but will not give a negative unless the full data also indicates a negative. As the majority of scheduling operations will not result in a conflict, this is a useful feature as it can enable non-conflict situations to be rapidly and efficiently identified with the rarer potential conflict situations being referred for further analysis.

Such further analysis is facilitated in embodiments in which each transaction entry includes a conflict list having respective entries for each of the one or more processing transactions with which said processing transaction has previously conflicted. After a match with the summary conflict entry, this conflict list data can be compared with a corresponding list of the currently executing processing transactions to confirm whether or not a conflict does exist. Thus, the summary information identifies a potential conflict (e.g. in hardware) and the list information serves to confirm or not confirm (e.g. in software) such potential conflicts.

The storage space required for the conflict data may be reduced in other embodiments in which each transaction entry within the conflict data corresponds to a plurality of processing transactions and stores data indicative of one or more processing transactions with which any of the plurality of processing transactions has previously conflicted. It will be appreciated that there is a balance between the storage requirements of the conflict data and the occurrence of false positives identifying conflicts for a processing transaction whereas in reality the previously detected conflict was between a different pair of processing transactions.

The information regarding which processing transactions are currently executing upon the plurality of processes may be provided by storing status data. The scheduling operation can compare the status data with the conflict data of a candidate processing transaction to identify if any of the currently executing processing transactions have previously conflicted with the candidate processing transaction.

The status data can include summary status data indicative of which processing transactions are currently executing upon the plurality of processors. As previously discussed, this summary status entry may be compared with summary conflict entry data of a candidate processing transaction to identify potential conflicts.

The transaction identifier can have a wide variety of different forms. In one form it is dependent upon a thread identifier associated with a processing transaction giving rise to a conflict and a program counter value corresponding to a starting program address of the processing transaction giving rise to the conflict. This combination provides a good degree of specificity with respect to the processing transaction. This specificity can be further enhanced by forming the transaction identifier to be dependent upon one or more of at least one input data value to the processing transaction and at least one memory address value accessed by the processing transaction.

In some embodiments, the processors may be modified to be responsive to a native program instruction to trigger a check using the conflict data for a potential conflict with any currently executing processing transaction. Thus, the processors can provide hardware support to facilitate more efficient use (and potentially generation) of the conflict data in managing conflicts and controlling the scheduling within a hardware transactional, memory system.

The check for conflicts may be performed with an initial stage under hardware control and comparing summary data with a further stage performed under software control to confirm a conflict if a potential conflict is identified by the initial stage.

The scheduling of processing transactions in dependence upon the conflict data, and in particular the rescheduling of processing transactions which have been delayed due to identification of a potential conflict, represents a system overhead. This system overhead can be more readily supported in embodiments in which a call is made to at least one of an operating system and scheduling software to trigger attempting rescheduling of processing transactions for which the conflict data previously indicated a potential conflict.

The processing to be performed may be divided into a plurality of processing threads with at least one of the processing threads comprising one or more processing transactions. Within such a system it may be desirable that at least one of an operating system and scheduling software serve to trigger attempted rescheduling of processing transactions for which the conflict data previously indicated a potential conflict.

The processing to be performed may be divided into a plurality of processing threads with at least one of the processing threads comprising one or more processing transactions. Within such a system it may be desirable that at least one of an operating system and scheduling software acts upon data characterising one or more of which threads exist to be scheduled, which threads are currently running, which threads are waiting to be scheduled and which threads cannot currently be scheduled due to a potential conflict indicated by the conflict data.

In some embodiments when an executing processing transaction completes a search operation can be performed to identify any blocked processing transactions that were being prevented from being scheduled as the conflict data indicated a potential conflict with the executing processing transaction which has just completed. If any such blocked processing transactions are identified, then they can be marked so as to be released and eligible for future scheduling.

Management of the processing threads may be performed using an operating system which controls issue of processing threads marked as active and does not issue processing threads marked as pended. The scheduling software may be responsive to the conflict data to update the marking of processing threads as either active of pended.

When a conflict arises during execution of a processing transaction that is then aborted, the scheduling software can call the operating system to mark the processing thread including the aborted processing transaction as a pended processing thread. When such a processing thread has been marked as pended and the processing transaction aborted, the operating system can then search for a processing thread to issue in its place.

Viewed from another aspect the present invention provides apparatus for processing data comprising:

a plurality of processors;

a transactional memory configured to detect conflicts arising between concurrent processing transactions executed by respective processors accessing shared data within said transactional memory;

a conflict data store responsive to said conflicts to store conflict data for respective processing transactions indicative of with which other processing transactions a conflict has previously been detected; and scheduling circuitry responsive to said conflict data to schedule processing transactions to be executed.

It will be appreciated that at least the conflict data store and the scheduling circuitry could be provided with dedicated hardware or general purpose hardware operating under software control or a mixture.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 is a diagram schematically illustrating the structure of status data indicative of the status of currently executing processing transactions upon the plurality of processors;

FIG. 5 is example code for scheduling a transaction to either run or block waiting for a conflicting transaction to finish together with code that is executed when a transaction completes;

DESCRIPTION OF THE PREFERRED EMBODIMENTS

Figure 1:
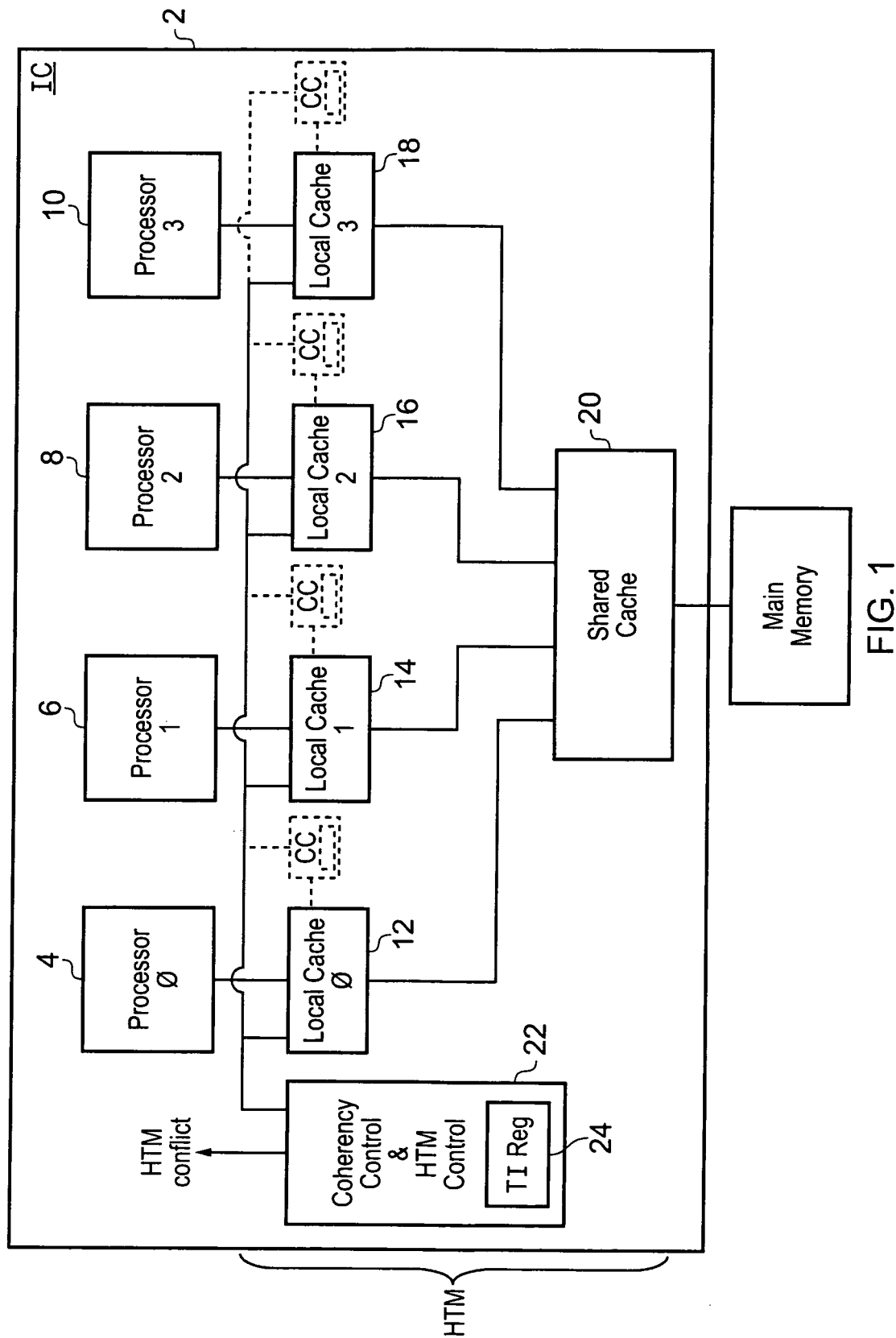
FIG. 1 schematically illustrates an integrated circuit comprising a plurality of processors and a hardware transactional memory.

FIG. 1 schematically illustrates an integrated circuit 2 including four processors 4, 6, 8, 10 which share a hardware transactional memory comprises respective local caches 12, 14, 16, 18 and a shared cache 20. Coherency control and hardware transactional memory control circuitry 22 is provided coupled to the local caches 12, 14, 16, 18 to support cache coherency between the local caches 12, 14, 16, 18 in accordance with conventional techniques as well as supporting hardware transactional memory control. When respective different processors 4, 6, 8, 10 seek to access a data value within the hardware transactional memory 12, 14, 16, 18, 20 in a manner which violates coherency requirements (e.g. a read-after-write hazard etc), then this is identified by the coherency control and hardware transactional memory control circuitry 22 and a hardware transactional memory conflict signal is issued to trigger appropriate recovery processing, such as aborting the processing transaction which has given rise to the conflict and restoring the state on the processor which was executing that aborted transaction back to the point prior to the start of execution of that aborted transaction. Conflict data characterising previously encountered conflicts will also be updated.

Compared with conventional cache coherency control mechanisms, the system of FIG. 1 is modified such that when a processor 4, 6, 8, 10 is to abort a transaction due to a detected conflict, it receives a transaction identifier for the processing transaction that cause it to be aborted for storing within a transaction identifier register 24. The action of transmitting the transaction identifier from the conflicting processor to the aborting processor can be a hardware controlled and performed process. This transaction identifier can then be read from the transaction identifier register 24 when forming the conflict data (in dependence upon which scheduling of processing transactions and threads is subsequently performed). The transaction identifier may also be stored with a general purpose register of a register bank with the aborting processor. The aborting transaction will typically be performing a significant amount of other "housekeeping" operations at this time as part of the abort process and so the additional task of updating the conflict data will have little additional impact.

The transaction identifiers are assigned in advance in software (e.g. in the scheduling runtime described below). The software can, for example, read a thread identifier and a program counter value (PC) and hash this into a value that is then written into a register as the transaction identifier. The software could also assign the transaction identifiers arbitrarily and/or they may be defined by a programmer. Another possible embodiment would be for the hardware to read a thread identifier and program counter value from respective registers and then perform a hash. In other embodiments the hardware could generate the transaction identifier itself in response to instructions embedded in the instruction stream (e.g. TMSTART, TMEND) using hardware access to a thread identifier register and the program counter value of the TMSTART instruction.

As illustrated in FIG. 1, centralised coherency control and hardware transactional memory control circuitry 22 is provided. It will be appreciated that as an alternative it would be possible to provide separate coherency control and hardware transactional memory control circuitry associated with each of the local cache memories 12, 14, 16, 18. This is illustrated by the dotted line boxes in FIG. 1. In this alternative case, each of the local coherency control and hardware transactional memory control circuitry can include a transaction identifier register to which the transaction identifier of an aborting processing transaction can be reported when the processor concerned is executing the processing transaction against which the conflict has arisen.

The reporting of the transaction identifier in these example embodiments is that the aborting processing transaction receives the transaction identifier from the conflicting processor/thread which is not aborted. When the transaction identifier of the aborted processing transaction is read later, the identity of any processing transaction against which it conflicted can be identified by the operating system and/or scheduling software which is responsible for forming the conflict data.

Figure 2:
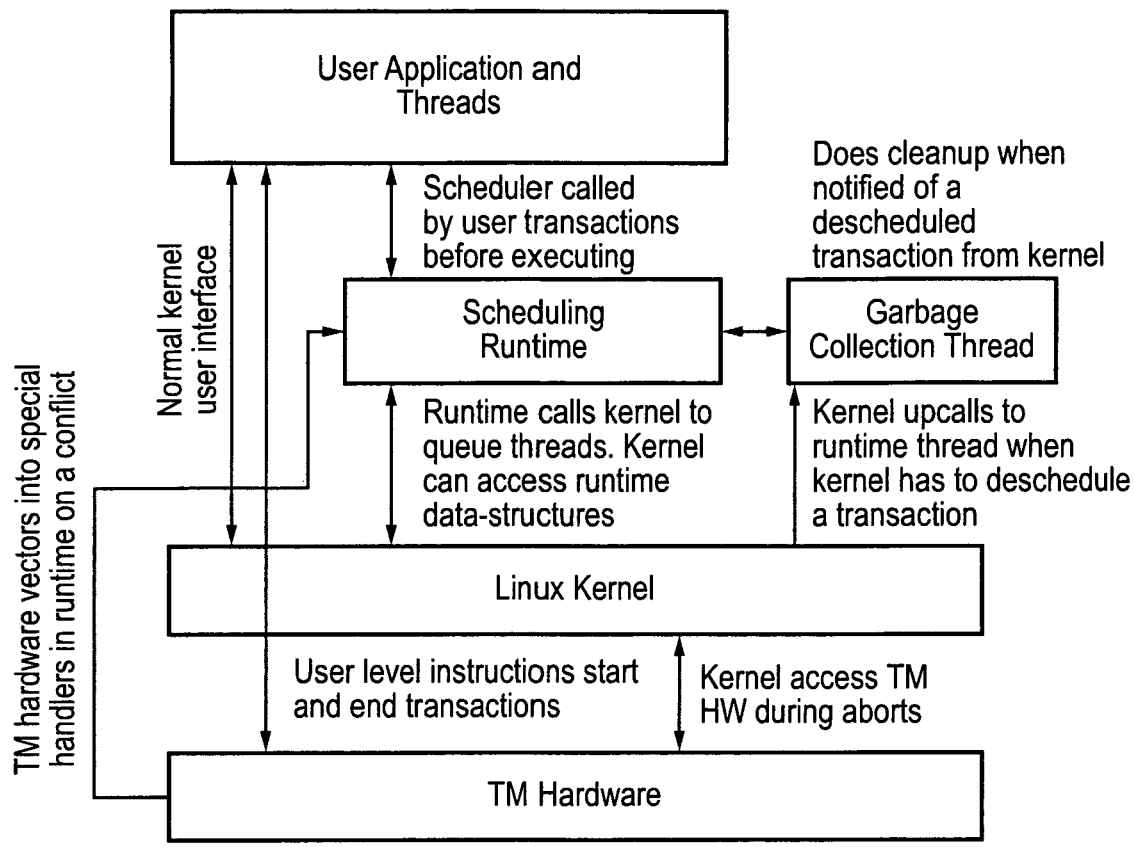
FIG. 2 is a diagram schematically illustrating the relationship between a scheduling runtime computer program and other elements within the processing system.

FIG. 2 schematically illustrates the relationship of scheduling runtime software with other elements within the system. In this example embodiment, the scheduling software in the form of the scheduling runtime deals with two distinct types of entities namely "processing threads" and "processing transactions". A "processing thread" is a piece of computer code that runs on a single processor concurrently with code running on other processors. A "processing transaction" is a piece of work that is executed by a thread, where memory accesses performed by the transaction appear atomic as far as other threads and transactions are concerned. A single thread can execute many transactions.

The scheduling runtime performs transaction scheduling and exists as middleware between the operating system and the user application. The scheduling runtime itself exists in user space to facilitate quick access. In FIG. 2, the interconnections and text illustrate how each piece of the system interacts in this example embodiment. The scheduling runtime is called when the user application wants to schedule a transaction, and then afterwards normal interactions with the hardware transactional memory (TM Hardware) and the operating system proceed. The operating system and the scheduling runtime store/manage data characterising which threads exist to be scheduled, which threads are currently running, which threads are waiting to be scheduled and which threads cannot currently be scheduled due to a potential conflict indicated by the conflict data. The operating system and scheduling runtime will store and manage other data in addition to the above.

When an executing processing transaction completes, the scheduling runtime performs a search operation to identify any blocked processing transactions that were being prevented from being scheduled as the conflict data indicated a potential conflict with the executing processing transaction which has just completed. (It will be appreciated that there are other situations where such a wakeup search can be performed. For example, when a transaction is aborted due to a conflict and the system must determine another thread to be scheduled; regularly on a time tick; etc.) In this case, any so identified blocked processing transaction can then be released so as to be eligible for scheduling. A blocked processing transaction can be marked as "pended" and a processing transaction released and available for scheduling can be marked as "active". When a conflict arises during execution of a processing transaction that is then aborted, the scheduling runtime can call the operating system to mark the processing thread concerned as a pended processing thread. As this processing thread has been aborted, a processor will be available to perform other processing operations and accordingly the operating system searches for a processing thread to issue to that processor in place of the pended processing thread. The occurrence of a conflict can be used to trigger a call to at least one of the operating system or the scheduling runtime to trigger attempted rescheduling of processing transactions for which the conflict data had previously indicated a potential conflict (i.e. those processing transactions are part of a pended processing thread). This can provide a mechanism whereby pended processing threads (potentially conflicting processing transactions) are resubmitted as candidate processing transactions for rescheduling at a later time.

Figure 3:
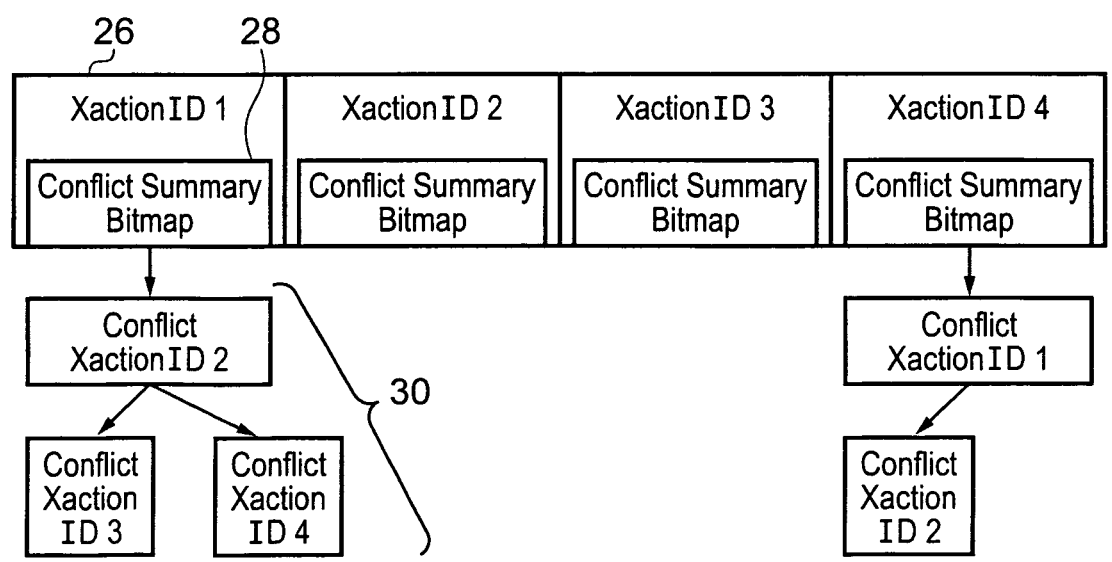
FIG. 3 is a diagram schematically illustrating the structure of conflict data indicative of previously encountered conflicts between transactions.

FIG. 3 schematically illustrates conflict data which can be used by the scheduling runtime to at least partially control the scheduling of processing transactions (within processing threads). This conflict data includes a transaction entry 26 for each processing transaction where a conflict has previously been identified. Processing transactions where no conflict has previously been identified need not have an entry within the conflict data.

The transaction entry includes summary conflict data 28, which can be generated by a hash function, such as a Bloom filter, to summarise the entries in the conflict list data 30 for that transaction entry. The conflict data of FIG. 3 is used to predict which transactions will conflict in the future by using past conflict history. The conflict data may be provided in the form of a table structured such as a hashed table that is indexed by a hash of the transaction ID for the processing transaction upon which a conflict check is being performed.

As an initial stage of the check the summary conflict data 28 is compared against summery status data representing the currently executing processing transactions on other processors to identify if a potential conflict exists. The summary conflict and status data may be inexact in the interests of increased speed and efficiency and accordingly generate some false positive results. However, the summary conflict and status data is provided in a form that does not produce negative results unless the full data would also indicate negative such that if the summary conflict data 28 does not indicate a conflict with the corresponding summary status data for the currently executing processing transactions elsewhere, then no conflict is predicted to exist. Conversely, false positive results can be removed by the further stage in the check whereby the conflict list data 30 is compared with a list of the currently existing processing transactions. This conflict list data can use the more specific transaction identifiers which can be compared with the transaction identifiers of the current existing processing transactions as will be described below.

The conflict data can be subject to processing to remove "stale" conflicts, i.e. remove conflicts which have not arisen for greater than a predetermined time.

Example pseudo code for generating a Conflict Summary Bitmap would be:
 for each XactionID in table conflict Summary Bitmap=0;
 for each Conflict Xaction IDS in list Conflict Summary
  Bitmap |=hash(Conflict XactionID);

More efficient schemes can be anticipated (e.g. just update on insertion and only using inserted ID—no need to rerun whole calculation—with the example hash there is no need to repeat the whole calculation on the insertion of a TransactionID into the list, the Conflict Summary Bitmap may just be updated using the newly added TransactionID).

For a 64-bit summary bitmap size an example hash function is:
 hash(x)=x % 64;

FIG. 4 schematically illustrates the status data indicating which processing transactions are currently executing on the processors 4, 6, 8, 10. This status data tracks all the running threads in the system and what processing transactions they are currently running. Each thread in the user application is given an entry in the data structure of the status data and is called a virtual CPU. Each entry has an attached status entry that tracks what processing transaction is running, if any, by logging the transaction identifier. The entry also tracks if the thread is currently "running" a processing transaction, "aborting" a processing transaction or "not running" a processing transaction (which may mean it is executing regular code which is not divided into processing transactions or has been suspended). Each entry in the status data also includes a list of all threads that are waiting for it to finish (i.e. are pended) due to being predicted as giving rise to a conflicting transaction.

Summary status data 32 is generated by hashing the transaction identifiers for all the running transactions using a hash function equivalent to the hash which generated the summary conflict data 28 discussed previously. In this way, the summary status data 32 can be compared with the summary conflict data 28 of a candidate processing transaction to be executed so as to identify rapidly if a potential conflict exists. This initial comparison of summary conflict data 28 and summary status data 34 can be performed by hardware triggered by a native processing instruction (TM-START) executing on the processor concerned prior to the processing transaction instructions. This initial check can accordingly be rapid and efficient. If this initial check indicates the potential for a conflict, then the further stage in the check process is performed whereby the conflict list data 30 is compared with the full status data of FIG. 4 under software control, such as under control of the scheduling runtime. This further stage of the checking process should be relatively infrequently invoked as predictions of conflict should be relatively infrequent.

In order to save storage space associated with the conflict data of at least FIG. 3, it is possible to combine the information characterising the conflicts associated with a plurality of processing transactions into one transaction entry 26. This conflict information will then alias upon different processing transactions to those with which it arose and accordingly produce some false positives. The reduction in storage space requirements may nevertheless justify this problem. It is also possible to reduce the information stored in the table in other ways, e.g. by storing only the last N conflicts detected per entry in the table or by storing the N transactions most likely to cause conflicts by tracking the seen conflicts and assigning them confidence values that are updated as the program(s) run. The number of conflicts tracked can be greater than N and/or N can be a value that varies with predicted unlikely-to-conflict transactions being periodically removed. N could vary for each transaction entry to make better use of the storage available.

As an example, N could be a dynamic value, where you would prune the tree of any past conflict that had a low confidence value. Accordingly, using some confidence metric, like a saturating counter that gets incremented every conflict and decremented using some method, the system can prune away entries when their confidence drops below a certain threshold. This way the system mainly stores high confidence of conflicting transactions, making searching the tree faster. A method to decrement a confidence counter is to summarize its read/write set in a similar way as for summarizing transaction IDs.

That memory footprint summary can then be saved and any blocked transactions waiting on this transaction will then inspect the summary and determine if they would have conflicted (useful serialization, increment confidence) or if they would not have conflicted (unnecessary serialization, decrement confidence).

Example pseudo code for generating Xaction Summary Bitmap

Xaction Summary Bitmap=0;
for each Virtual CPU in table
    Xaction Summary Bitmap |=hash(XactionID);
For a 64-bit summary bitmap size, an example hash function is:
    hash(x)=x % 64;

The data structures of FIG. 3 and FIG. 4 as well as the scheduling runtime and operating system of FIG. 2 are used to predict whether a thread trying to schedule a transaction can run in parallel with other concurrently running transactions already in the system. Each time a transaction wants to execute, the code illustrated in the upper portion of FIG. 5 is executed; to detect potential conflicts and determine if it can run, or needs to be queued and wait pended for another transaction to finish. When a thread finishes running its transaction, the scheduling runtime can be called again to wake up (reschedule) any threads waiting for it to finish. This can be achieved by the code illustrated in the lower portion of FIG. 5.

Figure 6:
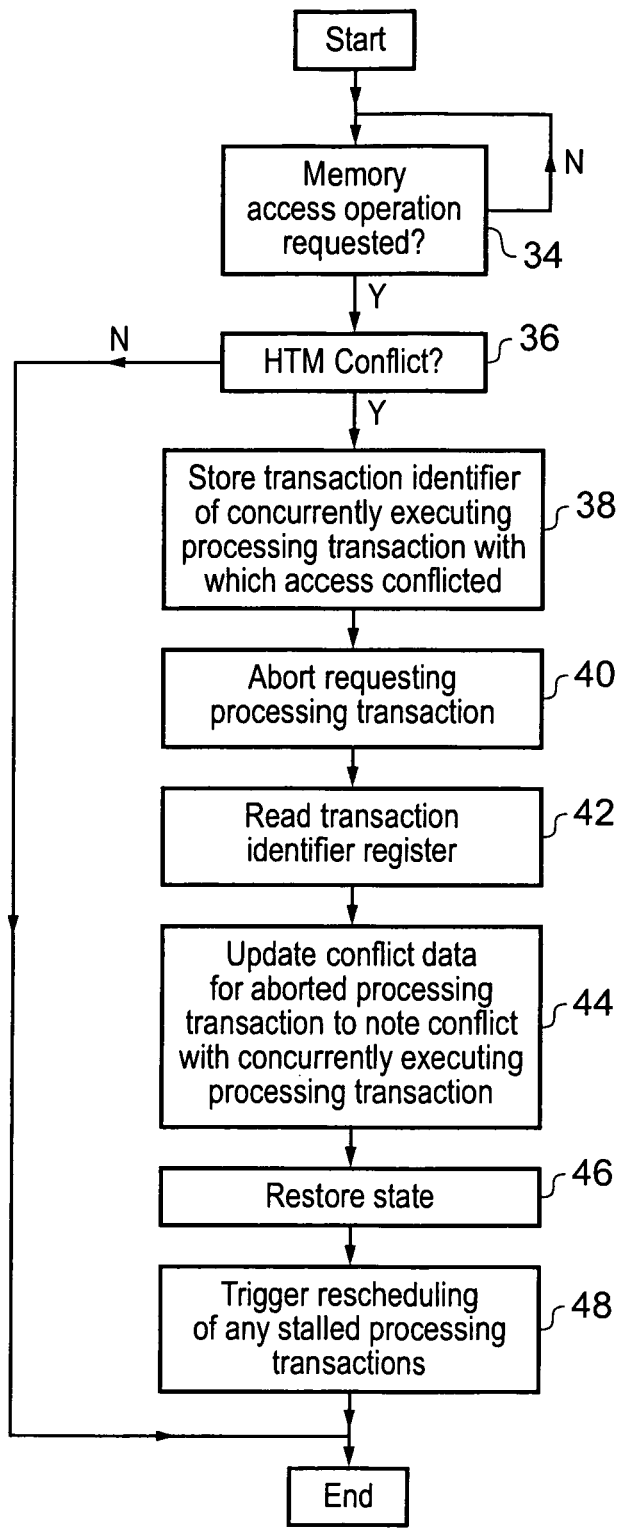
FIG. 6 is a flow diagram schematically illustrating processing performed when a memory access operation is requested so as to identify conflicts between processing transactions.

FIG. 6 is a flow diagram illustrating the processing performed when a processing transaction is executing to detect hardware transactional memory conflicts. At step 34 processing waits until a memory access operation is requested in association with a processing transaction; At step 36 the coherency control and hardware transaction memory control circuitry 22 illustrated in FIG. 1 is used to detect any hardware transactional memory conflict. If no such conflict is detected, then this conflict detecting processing finishes and the memory operation requested completes in the normal fashion.

If the determination at step 36 is that a hardware transactional memory conflict has arisen, then processing proceeds to step 38 at which the transaction identifier of the processing transaction which was already running and with which the conflict would occur if the memory access operation was to proceed is returned. This transaction identifier can be stored within a transaction identifier register 24 as illustrated in FIG. 2. The transaction identifier may also be stored within a general purpose register of the processor concerned (i.e. the one in which the conflicting transaction was attempting to run) as this processor will have its activity aborted at step 40 and accordingly its general purpose registers will be available for reuse.

At step 42 the transaction identifier register is read by the scheduling runtime and then at step 44 the conflict data for the aborted processing transaction is updated to note the newly encountered conflict with the concurrently executing processing transaction as indicated by the transaction identifier register content. At step 46 the state of the processor which was attempting to run the aborted processing transaction is restored to the point prior to that aborted processing transaction. The storage of such recovery state within systems employing hardware transactional memories enables the transactions to be aborted and the state rolled back to previously known good state. At step 46 a rescheduling of any stalled processing transactions as indicated by the status data of FIG. 4 is attempted. It may be that none of these stored processing transactions is yet able to be run as they are still blocked by other processing transactions, but it may be that the processing transaction that has just aborted does release some stalled threads or that some other threads have completed their execution and accordingly the reason for stalling those pended threads has been removed.

Figure 7:
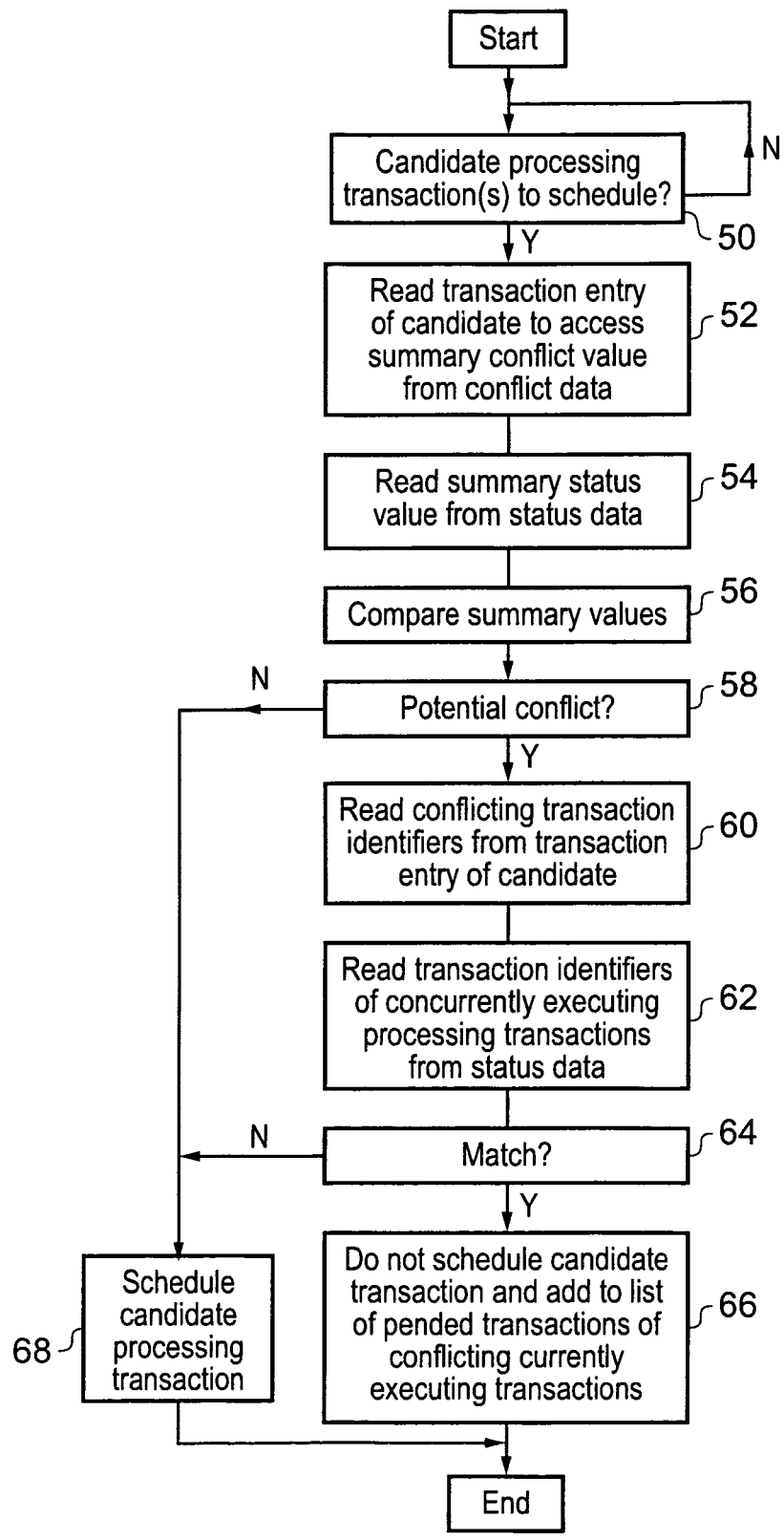
FIG. 7 is a flow diagram schematically illustrating a scheduling operation for a candidate processing transaction to determine whether or not there is a conflicting transaction which is already running.

FIG. 7 is a flow diagram illustrating the operation of the scheduling. At step 50 the system waits until a candidate processing transaction or transactions is to be scheduled. It may be that processing transactions are considered in groups with conflicts for any member of that group being identified using the conflict data and used to pend all of the transactions within that group to a later time. This can save overhead associated with the scheduling checks at the loss of some granularity in the control of individual processing transactions.

When a candidate processing transaction requires scheduling as identified at step 50, processing proceeds to step 52 at which the transaction entry for the candidate transaction is read in the form of the summary conflict data value 28. Step 54 then reads the summary status data value 32 characterising the currently executing processing transactions. Step 56 compares the summary data read at steps 52 and 54. If a potential conflict is identified, then step 58 directs processing to step 60. This potential conflict may be a false positive. Step 60 seeks to perform a further stage of checking by reading the conflicting transaction identifiers from the conflict list data 30 of the transaction entry 26. Furthermore, the transaction identifiers associated with each of the virtual CPUs of the status data of FIG. 4 are read at step 62. Step 64 determines whether or not there is a match between this conflict list data and the full status data. If there is a match, then the potential conflict is confirmed and step 66 serves not to schedule the candidate transaction and add it to the list of pended transactions (threads) associated with the currently executing transaction against which a conflict has been noted. This is the list of pended transactions illustrated as Thread1, Thread2 etc in FIG. 4.

If the determination at step 58 or at step 64 was that no conflict has arisen, then step 68 serves to schedule the candidate processing transaction.

Figure 8:
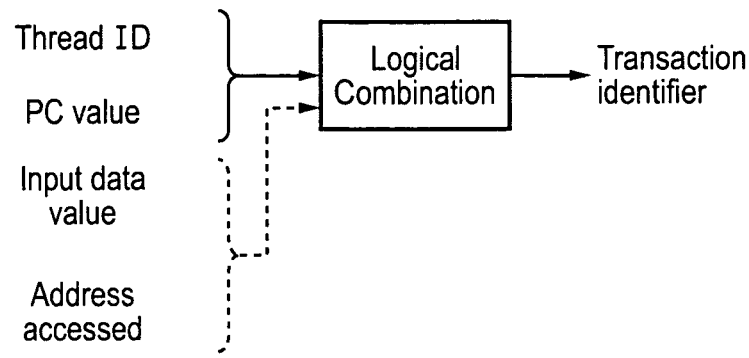
FIG. 8 illustrates how a transaction identifier may be formed.

FIG. 8 schematically illustrates how a transaction identifier can be derived. The transaction identifier can be derived by a logical combination, hash or otherwise in dependence upon its associated thread identifier and the program counter value corresponding to the start address of the code containing the processing transaction concerned. The transaction identifier can also additionally, or alternatively, be dependent upon an input data value to the thread or processing transaction concerned and the address within the memory being accessed by the processing transaction. Further ways of increasing the specificity of the transaction identifier are also possible.

Figure 9:
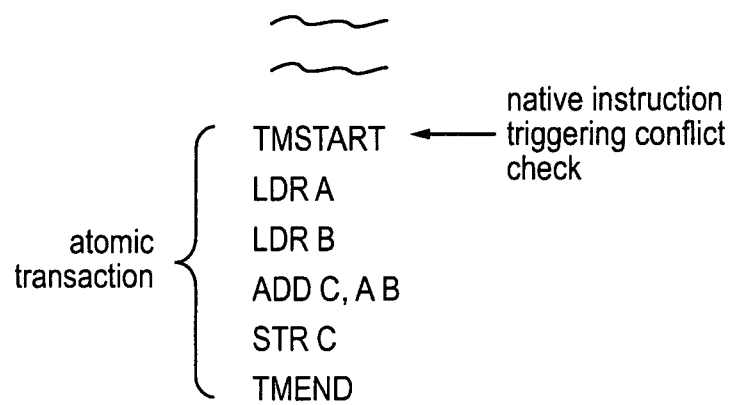
FIG. 9 schematically illustrates code corresponding to a processing transaction with native program instructions at the start and end serving to trigger a conflict check.

FIG. 9 schematically illustrates a code section of four ARM instructions corresponding to an atomic processing transaction. This is the type of processing transaction for which a hardware transactional memory seeks to identify conflicts with other concurrently executing processing transactions in order to facilitate parallel processing. The processing transaction of FIG. 9 is prefixed by a native instruction TMSTART which serves to trigger a conflict checking operation to be performed. This may be the combined hardware and, if necessary, software checking operation previously described. If this check is passed such that no conflict is identified, then the atomic processing transaction will complete. The native instruction TMEND indicates the end of the atomic processing transaction. The programmer or the compiler adds the native program instructions TMSTART and TMEND to the program which is to be parallel executed. The processors 4, 6, 8, 10 are modified to generate signals triggering the conflict check to be performed in response to these native instructions under control of the hardware transaction memory control circuitry 22 and/or the scheduling runtime as previously discussed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing data using a plurality of processors and a transactional memory, said method comprising the steps of:
   detecting with said transactional memory and a conflict checking operation, conflict arising between concurrent processing transactions executed by respective processors accessing shared data within said transactional memory, each processing transaction comprising work executed by one of the processors between a transaction start instruction and a transaction end instruction, wherein the transaction start instruction and transaction end instruction are native instructions included in program code to be executed on one of the plurality of processors, and wherein the conflict checking operation is triggered by the transaction start instruction;
   in response to detecting said transactional memory conflict arising between concurrent processing transactions executed by the respective processors, triggering recovery processing including aborting one of the concurrent processing transactions and restoring processor state of the processor executing the aborted transaction to a point prior to a start of execution of the aborted transaction;
   storing conflict data for respective processing transactions indicative of with which other processing transactions a conflict has previously been detected; and
   scheduling future processing transactions to be executed in dependence upon said conflict data from previously executed processing transactions between which said conflict arose, wherein said previously executed processing transactions comprise transactions which are no longer active, and in response to detecting a potential conflict between a future processing transaction to be scheduled and a currently executing transaction using the conflict data from previously executed processing transactions, delaying scheduling of said future processing transaction until said currently executing transaction has completed.

2. A method as claimed in claim 1, wherein, upon detecting a conflict, said transactional memory provides a transaction identifier indicative of a processing transaction with which said conflict has arisen.

3. A method as claimed in claim 2, wherein said transactional memory stores said transaction identifier within at least one of:
   a dedicated transaction identifier register;
   a general purpose register within a register bank; and
   a memory location.

4. A method as claimed in claim 2, wherein said transaction identifier is read and used by conflict software to form said conflict data.

5. A method as claimed in claim 1, wherein said scheduling is at least partially performed by scheduling software responsive to said conflict data.

6. A method as claimed in claim 1, wherein said scheduling is at least partially performed by scheduling hardware responsive to said conflict data.

7. A method as claimed in claim 1, wherein said conflict data comprises a plurality of transaction entries, each transaction entry corresponding to a processing transactions and at least some of said transaction entries storing data at least indicative of one or more processing transactions with which said processing transaction has previously conflicted.

8. A method as claimed in claim 7, wherein each transaction entry includes a summary conflict entry indicative of said one or more processing transactions with which said processing transaction of that transaction entry has previously conflicted and said scheduling includes comparing a summary conflict entry for a candidate processing transaction with corresponding summary status data indicative of currently executing processing transactions so as to identify a potential conflict.

9. A method as claimed in claim 8, wherein each transaction entry includes a conflict list having respective entries for each of said one or more processing transactions with which said processing transaction has previously conflicted and, after a match with said summary conflict entry of a matching transaction entry, said scheduling includes comparing a conflict list for said matching transaction entry with said currently executing processing transactions so as to confirm a potential conflict.

10. A method as claimed in claim 1, wherein said conflict data comprises a plurality of transaction entries, each transaction entry corresponding to a plurality processing transactions and storing data at least indicative of one or more processing transactions with which any of said plurality of processing transaction has previously conflicted.

11. A method as claimed in claim 1, comprising storing status data indicative of which processing transactions are currently executing upon said plurality of processors.

12. A method as claimed in claim 11, wherein said scheduling includes comparing said status data with said conflict data of a candidate processing transaction to identify if any of said currently executing processing transactions have previously conflicted with said candidate processing transaction.

13. A method as claimed in claim 11, wherein said status data includes a summary status entry indicative of which processing transactions are currently executing upon said plurality of processors.

14. A method as claimed in claim 1, wherein said conflict data comprises a transaction identifier formed in dependence upon a thread identifier associated with a processing transaction giving rise to a conflict and a program counter value corresponding to a starting program address of said processing transaction giving rise to said conflict.

15. A method as claimed in claim 1, wherein said transactional memory is a hardware transactional memory including at least some support circuitry supporting a transactional memory model of operation.

16. A method as claimed in claim 1, wherein each of said processors is responsive to a native program instruction to trigger a check using said conflict data for a potential conflict with any currently executing processing transaction.

17. A method as claimed in claim 16, wherein said check comprises:
   an initial stage performed under hardware control and comparing summary data to identify if no conflict is predicted; and
   a further stage performed under software control if said initial stage does not identify that no conflict is predicted to confirm whether a conflict is predicted.

18. A method as claimed in claim 1, wherein, when a conflict is identified, a call is made to at least one of an operating system and scheduling software to trigger attempted rescheduling of processing transactions for which said conflict data previously indicated a potential conflict.

19. A method as claimed in claim 1, wherein processing to be performed is divided in to a plurality of processing threads, at least one of said processing threads comprising one or more processing transactions, and at least one of an operating system and scheduling software access data characterising one or more of:
   which threads exist to be scheduled;
   which threads are currently running;
   which threads are waiting to be scheduled; and
   which threads cannot currently be scheduled due to a potential conflict indicated by said conflict data.

20. A method as claimed in claim 1, wherein when an executing processing transaction completes, a search operation is performed to identify any blocked processing transactions that were being prevented from being scheduled as said conflict data indicated a potential conflict with said executing processing transaction, any identified blocked processing transaction then being released so as to be eligible for scheduling.

21. A method as claimed in claim 1, wherein an operating system controls issue to one of said plurality of processors of processing threads marked as active processing threads and does not issue processing threads marked pended processing threads, scheduling software responsive to said conflict data serving to update marking of processing threads as either active processing threads or pended processing threads.

22. A method as claimed in claim 21, wherein when a conflict arises during execution of a processing transaction that is then aborted, said scheduling software calls said operating system to mark said processing thread including said processing transaction that was aborted as a pended processing thread.

23. A method as claimed in claim 22, wherein, followed marking of said processing transaction that was aborted as a pended processing thread, said operating system searches for a processing thread to issue in place of said pended processing thread.

24. Apparatus for processing data comprising:
   a plurality of processors;
   a transactional memory configured to perform a conflict checking operation to detect conflicts arising between concurrent processing transactions executed by respective processors accessing shared data within said transactional memory and, in response to detecting a conflict between concurrent processing transactions executed by the respective processors, to trigger recovery processing including aborting one of the concurrent processing transactions and restoring processor state of the processor executing the aborted transaction to the point prior to the start of execution of the aborted transaction, each processing transaction comprising a work executed by one of the processors between a transaction start instruction and a transaction end instruction, wherein the transaction start instruction and transaction end instruction are native instructions included in program code to be executed on one of the plurality of processors, and the transactional memory is configured to perform the conflict checking operation triggered by the transaction start instruction;
   a conflict data store configured to store conflict data for respective processing transactions indicative of with which other processing transactions a conflict has previously been detected; and
   scheduling circuitry, responsive to said conflict data from previously executed processing transactions between which said conflict arose, configured to schedule future processing transactions to be executed, wherein said previously executed processing transactions comprise processing transactions which are no longer active, and in response to detecting a potential conflict between a future processing transaction to be scheduled and a currently executing transaction using the conflict data from previously executed processing transactions, delaying scheduling of said future processing transaction until said currently executing transaction has completed.

25. Apparatus as claimed in claim 24, wherein, upon detecting a conflict, said transactional memory provides a transaction identifier indicative of a processing transaction with which said conflict has arisen.

26. Apparatus as claimed in claim 25, wherein said transaction identifier is read and used by conflict software to form said conflict data.

27. Apparatus as claimed in claim 24, wherein said scheduling circuitry is at least partially controlled by scheduling software responsive to said conflict data.

28. Apparatus as claimed in claim 24, wherein said scheduling circuitry is at least partially performed by dedicated scheduling hardware responsive to said conflict data.

29. Apparatus as claimed in claim 24, wherein said conflict data comprises a plurality of transaction entries, each transaction entry corresponding to a processing transactions and at least some of said transaction entries storing data at least indicative of one or more processing transactions with which said processing transaction has previously conflicted.

30. Apparatus as claimed in claim 29, wherein each transaction entry includes a summary conflict entry indicative of said one or more processing transactions with which said processing transaction of that transaction entry has previously conflicted and said scheduling includes comparing a summary conflict entry for a candidate processing transaction with corresponding summary status data indicative of currently executing processing transactions so as to identify a potential conflict.

31. Apparatus as claimed in claim 30, wherein each transaction entry includes a conflict list having respective entries for each of said one or more processing transactions with which said processing transaction has previously conflicted and, after a match with said summary conflict entry of a matching transaction entry, said scheduling includes comparing a conflict list for said matching transaction entry with said currently executing processing transactions so as to identify a potential conflict.

32. Apparatus as claimed in claim 24, wherein said conflict data comprises a plurality of transaction entries, each transaction entry corresponding to a plurality processing transactions and storing data at least indicative of one or more processing transactions with which any of said plurality of processing transaction has previously conflicted.

33. Apparatus as claimed in claim 24, comprising a status data store for storing status data indicative of which processing transactions are currently executing upon said plurality of processors.

34. Apparatus as claimed in claim 33, wherein said scheduling circuitry compares said status data with said conflict data of a candidate processing transaction to identify if any of said currently executing processing transactions have previously conflicted with said candidate processing transaction.

35. Apparatus as claimed in claim 33, wherein said status data includes a summary status entry indicative of which processing transactions are currently executing upon said plurality of processors.

36. Apparatus as claimed in claim 24, wherein said conflict data comprises a transaction identifier formed in dependence upon a thread identifier associated with a processing transaction giving rise to a conflict and a program counter value corresponding to a starting program address of said processing transaction giving rise to said conflict.

37. Apparatus as claimed in claim 36, wherein said transaction identifier is formed in dependence upon one or more of:

at least one input data value to said processing transaction giving rise to said conflict; and at least one memory address value accessed by said processing transaction giving rise to said conflict.

38. Apparatus as claimed in claim 24, wherein said transactional memory is a hardware transactional memory including at least some support circuitry supporting a transactional memory model of operation.

39. Apparatus as claimed in claim 24, wherein each of said processors is responsive to a native program instruction to trigger a check using said conflict data for a potential conflict with any currently executing processing transaction.

40. Apparatus as claimed in claim 39, wherein said check comprises:

an initial stage performed under hardware control and comparing summary data to identify if no conflict is predicted; and a further stage performed under software control if said initial stage does not identify that no conflict is predicted to confirm whether a conflict is predicted.

41. Apparatus as claimed in claim 24, wherein, when a conflict is identified, a call is made to at least one of an operating system and scheduling software to trigger attempted rescheduling of processing transactions for which said conflict data previously indicated a potential conflict.

42. Apparatus as claimed in claim 24, wherein processing to be performed is divided in to a plurality of processing threads, at least one of said processing threads comprising one or more processing transactions, and at least one of an operating system and scheduling software access data characterising one or more of:

which threads exist to be scheduled;

which threads are currently running;

which threads are waiting to be scheduled; and which threads cannot currently be scheduled due to a potential conflict indicated by said conflict data.

43. Apparatus as claimed in claim 24, wherein when an executing processing transaction completes, a search operation is performed to identify any blocked processing transactions that were being prevented from being scheduled as said conflict data indicated a potential conflict with said executing processing transaction, any identified blocked processing transaction then being released so as to be eligible for scheduling.

44. Apparatus as claimed in claim 24, wherein an operating system controls issue to one of said plurality of processors of processing threads marked as active processing threads and does not issue processing threads marked pended processing threads, scheduling software responsive to said conflict data serving update marking of processing threads as either active processing threads or pended processing threads.

45. Apparatus as claimed in claim 44, wherein when a conflict arises during execution of a processing transaction that is then aborted, said scheduling software calls said operating system to mark said processing thread including said processing transaction that was aborted as a pended processing thread.

46. Apparatus as claimed in claim 45, wherein, followed marking of said processing transaction that was aborted as a pended processing thread, said operating system searches for a processing thread to issue in place of said pended processing thread.

* * * * *